United States Patent [19]
Gerhardt

[11] Patent Number: 5,758,911
[45] Date of Patent: Jun. 2, 1998

[54] LINEAR MOTION WIND DRIVEN POWER PLANT

[75] Inventor: Heinz A. Gerhardt, Redondo Beach, Calif.

[73] Assignee: Northrop Grumman Corporation, Los Angeles, Calif.

[21] Appl. No.: 597,858

[22] Filed: Feb. 7, 1996

[51] Int. Cl.⁶ .................................................. H02P 9/04
[52] U.S. Cl. ........................ 290/55; 290/54; 416/8; 104/24
[58] Field of Search ........................ 290/55, 54, 44, 290/43; 416/117, 132 B; 104/24

[56] References Cited

U.S. PATENT DOCUMENTS

| | | | |
|---|---|---|---|
| 665,810 | 1/1901 | Stretch | 290/55 |
| 1,923,971 | 8/1933 | Evans | 299/4 |
| 3,504,988 | 4/1970 | Stenner | 416/9 |
| 3,730,643 | 5/1973 | Davison | 416/8 |
| 4,088,352 | 5/1978 | Kling | 290/55 |
| 4,114,046 | 9/1978 | Yousef | 290/55 |
| 4,168,439 | 9/1979 | Palma | 290/44 |
| 4,302,684 | 11/1981 | Gogins | 290/55 |
| 4,527,950 | 7/1985 | Biscomb | 416/117 |
| 4,589,344 | 5/1986 | Davison | 104/24 |
| 4,730,119 | 3/1988 | Biscomb | 290/55 |
| 4,832,569 | 5/1989 | Samuelsen et al. | 416/17 |
| 5,134,305 | 7/1992 | Senehi | 290/55 |
| 5,193,978 | 3/1993 | Gutierrez | 416/24 |
| 5,215,015 | 6/1993 | Iida et al. | 104/23.1 |

FOREIGN PATENT DOCUMENTS

| | | |
|---|---|---|
| 2339753 | 8/1977 | France. |
| 977849 | 10/1981 | U.S.S.R. . |
| 1168314 | 10/1969 | United Kingdom . |

*Primary Examiner*—Thomas M. Dougherty
*Assistant Examiner*—Nicholas Ponomarenko
*Attorney, Agent, or Firm*—Terry J. Anderson; Karl J. Hoch, Jr.

[57] ABSTRACT

A linear motion wind driven power plant utilizes a closed-loop track having a plurality of carriages configured to move thereabout. At least one sail is formed to each of the carriages so as to be rotatable 360 degrees of azimuth. At least one electrical power generator generates electrical power from the movement of the carriages around the track. A sail assembly is defined by the sail, a sensor system for sensing lift generated by the action of the wind upon the sail, and a controller which causes the sail to turn to a position wherein the sensed lift of the sail is approximately maximized.

24 Claims, 5 Drawing Sheets

LINEAR MOTION WIND DRIVEN POWER PLANT

FIELD OF THE INVENTION

The present invention relates generally to wind driven electrical power plants and more particularly to a linear motion wind driven electrical power plant wherein a plurality of carriages have sails formed thereon such that the wind moves the carriages around a closed-loop track. Movement of the carriages causes at least one electrical power generator to generate electrical power. Each carriage comprises a sail, the angular position of which is controlled so as to maximize the power generated thereby.

BACKGROUND OF THE INVENTION

The conversion of natural energy, e.g., solar energy, wind energy, ocean tide and wave energy, into electrical energy is well known. The use of such natural energy sources has become more desirable in recent years due to concerns over the effects of fossil fuels on the environment and also due to the increasing cost of fossil fuels. Further, it is widely recognized that fossil fuels are in limited supply, thus further emphasizing the need to turn to natural energy sources.

Although windmills are a well known means for exploiting wind energy, windmills suffer from several inherent disadvantages. Tall towers must typically be constructed to accommodate large-diameter rotors and to position them high enough in the airstream to avoid the undesirable effects of air turbulence caused by obstructions at ground level. Further, the major mechanical components, i.e., the generator and associated mechanical linkage to the turbine, as well as the turbine controls and positioning apparatus, are typically located atop the tower as well, thus making maintenance difficult and expensive. Further, windmills only effectively extract energy from a circular cross section of an airstream, thereby substantially limiting their capability of extracting power from the wind stream.

In an attempt to overcome the inherent limitations associated with windmills, the prior art has developed various different linear motion wind driven power plants wherein one or more carriages having sails attached thereto are moved about a closed-loop track by the wind. Such movement of the carriages effects the generation of electrical power via various different means.

Examples of such prior art linear motion wind driven power plants are provided in: U.S. Pat. No. 665,810 issued to Stretch; U.S. Pat. No. 1,923,971 issued to Evans; U.S. Pat. No. 3,730,643 issued to Davison; U.S. Pat. No. 4,114,046 issued to Yousef; U.S. Pat. No. 4,302,684 issued to Gogins; U.S. Pat. No. 4,589,344 issued to Davison; U.S. Pat. No. 5,134,305 issued to Senehi; British Patent No. 1,168,314 issued to Stenner; Russian Patent No. 977,849 issued to Shevchenko; and French Patent No. 76 02698.

Thus, although contemporary windmills have proven generally suitable for their intended purpose, they possess inherent deficiencies which detract from their utility and desirability in the marketplace. As such, it is beneficial to provide a means for harnessing the power of the wind and converting such power into electrical energy in a manner which is both efficient and comparatively simple to construct and operate.

SUMMARY OF THE INVENTION

The present invention specifically addresses and alleviates the above-mentioned deficiencies associated with the prior art. More particularly, the present invention comprises a linear motion wind driven power plant comprising a closed-loop track, a plurality of carriages configured to move around the track, and at least one sail formed to each of the carriages so as to be rotatable to 360 degrees of azimuth. At least one electrical power generator generates electrical power from the movement of the carriages around the track.

A sail assembly comprises a sail, a sensor system for sensing lift provided by the action of the wind upon the sail, and a controller for causing the sail to rotate to a position wherein the sensed lift of the sail is approximately maximized.

The sensor system preferably comprises a plurality of strain gauges. A first set of strain gauges is preferably formed upon one side of the sail and a second set of strain gauges formed upon the other side thereof. Each set of strain gauges comprises a plurality of strain gauges formed at different heights, and optionally at different horizontal locations as well.

The controller preferably comprises a microprocessor. The microprocessor preferably receives a strain gauge input from a discriminator which selects the strain gauge having the highest output from those strain gauges on the side of the sail upon which lift is being generated.

The sails preferably comprise rigid sails having an aspect ratio of at least 10 to 1 and preferably extending approximately 75 meters in height. Thus, the sails extend above the ground boundary layer so as to be disposed within the path of more rapidly moving and less turbulent airflow. The sails formed upon adjacent carriages are spaced apart from one another by a distance approximate to that of the height of the sails, i.e. approximately 75 meters. The sails are preferably configured as wing-like structures resembling the blades of high-performance wind turbines.

The entire power plant is expected to generate electric power at a megawatt scale.

The sails preferably comprise flaps and are configured to have a side-to-side symmetric profile with sail camber being achieved via deflections of the flaps attached along the trailing edge of each sail. Optionally, bi-planar sails may be utilized.

Each sail comprises a vertical tail for trimming thereof. Thus, the tail functions in a fashion similar to a weather vane to insure that the sail's leading edge points generally into the direction of the relative wind vector. As those skilled in the art will appreciate, the relative wind vector is the vector sum of the ambient wind velocity and the motion of the sail (and the carriage) along the track.

A small deflection of the tail relative to the sail trims the sail such that the sail functions at a predetermined lift coefficient. Thus, the vertical tail functions in a manner similar to the horizontal tail of an aircraft. The sail is attached to a sail mast and the tail is mounted upon a tail boom which is attached to the sail mast. The sail mast is rotatable with respect to the carriage through 360 degrees of azimuth, as mentioned above.

The computerized controller assures that the sails are trimmed such that they generate a maximum product of force times velocity for any direction of the carriage movement along the track.

The controller preferably feathers the sails when the carriages move upwind and downwind, so as to minimize wind drag thereon. The controller also preferably varies the angle of attack of the sail, depending upon wind speed, such that the forward velocity of each carriage is maintained below a predetermined maximum velocity regardless of wind speed. This prevents damage to the linear motion wind driven power plant in the event of excessively high wind speeds which would otherwise tend to cause the carriages to move at an undesirably high speed.

The carriage is preferably magnetically levitated so as to mitigate frictional forces which inhibit movement thereof around the track. Lateral guidance is provided by means of a corresponding set of vertically-mounted magnets. The Small-Gap Magnetic Attraction System commonly associated with Maglev Transport Systems is preferably utilized for interfacing the carriages to the track. The Small-Gap Magnetic Attraction System is desirable since it provides levitation at any speed including full stops. Additionally, the use of such an air gap is necessary for efficient operation of the linear electric generator. However, the magnetic attraction system is unstable in that a decrease in gap height increases the magnetic attraction forces which tend to decrease the gap height even further. Thus, an active control system is required so as to reliably maintain gap height by continuously sensing gap height and adjusting the electric current in the levitating magnets.

However, in contrast to Maglev Transport System's design, the levitating and guiding magnets of the present invention are preferably installed in the track, rather than in the carriage. The dense carriage traffic of the present invention facilitate such positioning of the levitating and guiding magnets within the tracks, since substantially the entire track is utilized to support carriages, thereby making such construction efficient. According to the preferred embodiment of the present invention, the track comprises both levitating and guiding magnets.

The track comprises a closed-loop track preferably configured as an elongate oval having substantially straight and parallel sides. The substantially straight and parallel sides of the track are oriented such that they are perpendicular to the predominant direction of the wind. Thus, carriages traveling along the substantially parallel tracks travel predominantly in beam reach conditions. Those skilled in the art will appreciate that a beam reach is the most efficient sailing orientation, where the greatest speeds are achieved. Thus, the efficiency of the linear motion wind power plant of the present invention is optimized when the track thereof is so configured. Of course, various other configurations of the track may be necessitated by natural and/or man-made obstructions and by predicted variations in wind direction. Further, the carriages may be switchable among a plurality of differently oriented tracks, so as to accommodate such variations in wind direction. In any case, it is desirable to maximize the length of track extending generally perpendicular to the predominant direction of the wind.

The tracks are preferably configured to have a width of at least one-tenth the height of the sail so as to accommodate the bending moment developed by lateral wind loading. Optionally, at least one outrigger, preferably two outriggers, are formed to each carriage so as to further accommodate such bending moment. If a single outrigger is utilized, then that outrigger is preferably positioned so as to be on the inside of the track, thereby minimizing the land area utilized. If two outriggers are utilized, then one outrigger is preferably positioned on the inside of the track and the other outrigger is positioned on the outside thereof.

The electrical power generator comprises a plurality of magnets, either permanent or electromagnets, and a plurality of coils. Either the coils or the magnets are disposed upon or within the carriages, and the other is disposed along the track. According to the preferred embodiment of the present invention, the coils are disposed along the tracks, such that electrical energy generated thereby is readily available at stationary positions. Sliding contacts to transfer electrical power from coils disposed within the carriages to the tracks are thereby obviated. Electrical power is generated via movement of the magnets relative to the coils according to well-known induction principles.

Thus, each carriage, along with a track, defines a linear electric generator. These linear electrical generators may also be utilized as linear electrical motors so as to move the carriages under no-wind conditions. Such movement may be desired for maintenance purposes.

The plurality of carriages preferably define a closed-loop of interconnected carriages such that carriages moving upwind and/or downwind are pulled by other carriages, i.e., those traveling in a beam reach orientation relative to the wind. Thus, those carriages being driven by the wind function to drive those carriages which are not being driven by the wind around the track. Since those carriages moving under beam reach conditions move substantially faster than the velocity of the wind, carriages in such a closed-loop configuration will drive both those carriages moving upwind and those carriages moving downwind.

Optionally, the carriage may comprise a plurality of wheels riding upon the track. At least one electrical generator is driven by at least one of the wheels. One or more sliding contacts transfer electrical power from the generators to the ground.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 4b is a side view of the sail and tail of FIG. 4a;

FIG. 5b is a side view of the sail and tail of FIG. 5a; and

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention. The linear motion wind driven power plant of the present invention is illustrated in FIGS. 1–6 which depict a presently preferred embodiment of the invention.

Figure 1:
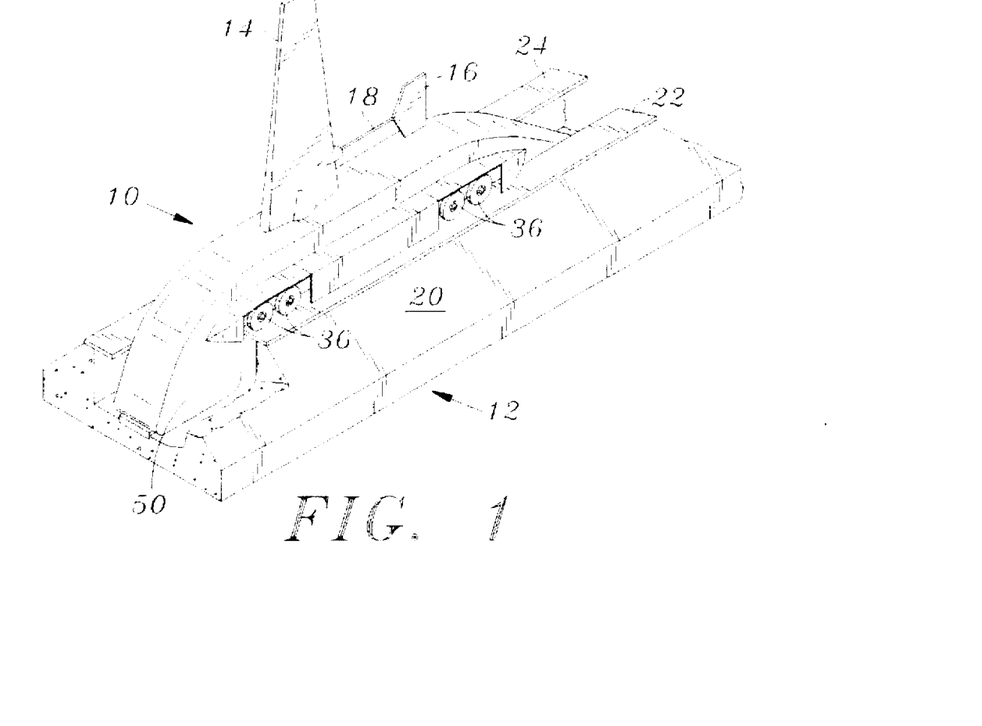
FIG. 1 is a perspective view of a single carriage disposed upon a section of track according to the present invention.
Figure 2:
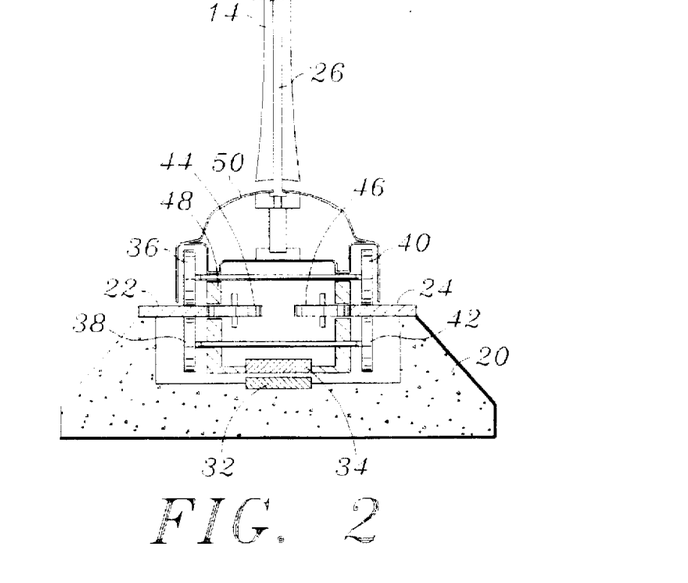
FIG. 2 is a cross section of the carriage of FIG. 1 taken through the sail mast thereof.

Referring now to FIGS. 1 and 2, the present invention generally comprises a carriage 10 configured to move along a track 12. The carriage 10 comprises a sail 14 typically mounted via a mast 26 thereto, so as to be capable of turning 360 degrees thereabout. A tail 16 is connected to the sail 14 via a tail boom 18.

The track is preferably formed upon an embankment 20 which permits a portion of the carriage 10 to be disposed below ground level, so as to minimize wind resistance and turbulence caused by the carriage 10. The carriage 10 rides upon first upper wheels 36 and first lower wheels 38 which capture first rail 22 therebetween and second upper wheels 40 and second lower wheels 42 which capture second rail 24 therebetween. The upper wheels 36 and 40 bear the weight of the carriage, while the lower wheels 38 and 42 resist the overturning movement caused by the long lever arm of the sail 14. First inside wheel 44 rides upon a generally vertical surface of the first rail 22 and second inner wheel 46 rides upon a generally vertical surface of the second rail 24, so as to provide lateral stability to the carriage 10 during movement thereof. As those skilled in the art will appreciate, various other configurations of wheels and rails are likewise suitable.

Alternatively, the carriage rides upon the track via magnetic levitation, preferably the Small-Gap magnetic attraction system MANS commonly associated with Maglev Transport Systems, as discussed in detail above.

A body 50 is formed upon a chassis 48 so as to provide suitable aerodynamic characteristics for reducing wind resistance during movement of the carriage 10.

A first generator member 32 is disposed along the track 12 and a second generator member 34 is disposed within the carriage 10. The first generator member 32 may comprise either a coil or a magnet and the second generator member 34 comprises the other, as discussed in detail above.

Figure 3:
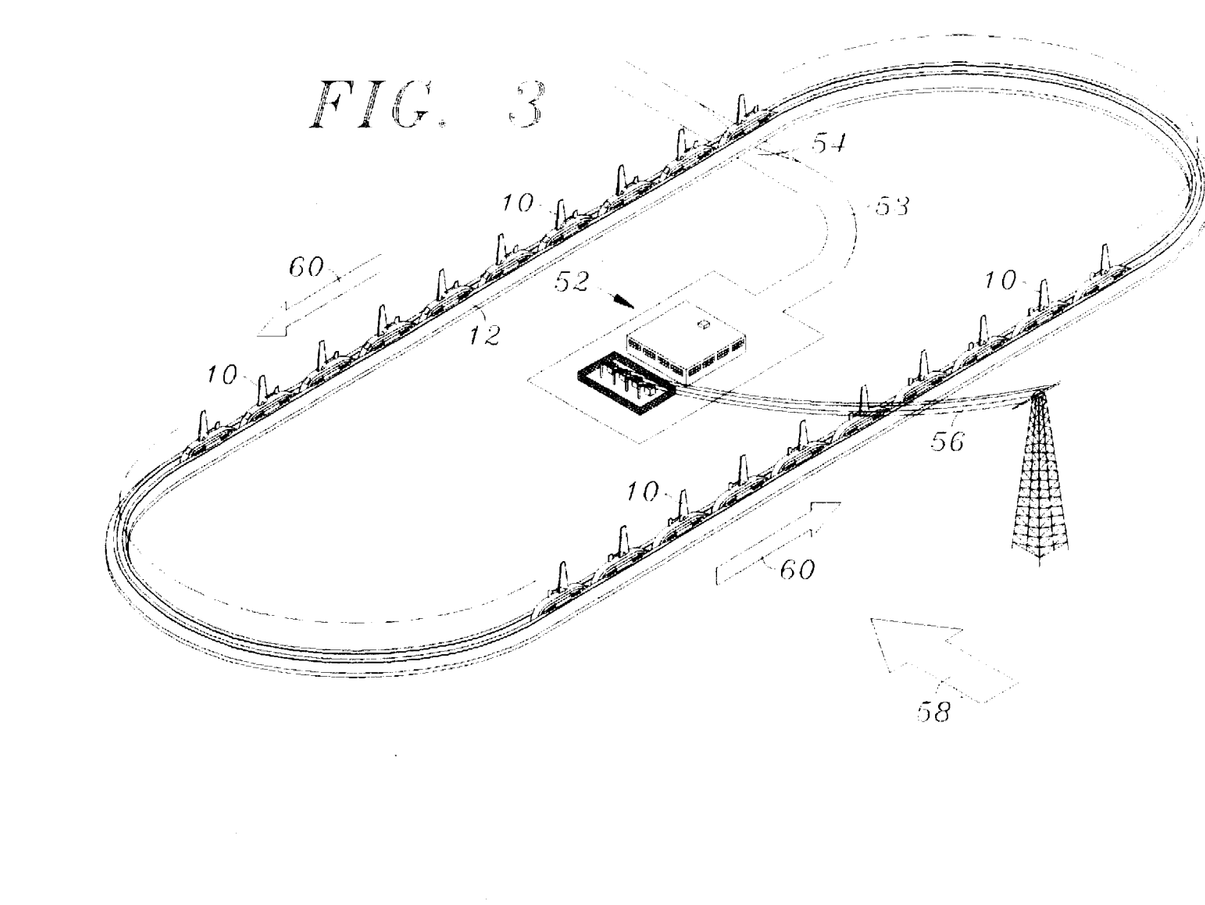
FIG. 3 is a perspective view of a plurality of carriages moving around an oval track according to the present invention.

Referring now to FIG. 3, the track 12 is preferably configured so as to define an elongate oval having two generally parallel sides oriented such that they are substantially perpendicular 60 to the prevailing wind direction 58. Thus, the carriages 10 travel in a beam reach configuration for most of their trip around the track 12, thereby maximizing their ability to convert wind 58 into electrical energy.

A control center 52 is preferably located within the track 12, thereby minimizing the land area required for the entire power plant. Power is transmitted from the electrical power generator defined by the carriages 10 and the track 12 to the control center 52 and from there, via power transmission lines 56, to be distributed as desired. The control center 52 further comprises controls for starting and stopping the carriages, as well as adjusting their speed as desired.

For example, either electrical slide connections or radio signals may be utilized to command the carriages to orient their sails for a particular desired speed, the maximum achievable speed, or for stopping. The sails 14 of individual carriages may be individually controllable such that, for example, the sails of those carriages traveling generally perpendicularly to the wind may be set for maximum lift, while the sails of carriage 10 traveling with and/or against the wind may be set to provide minimum drag, i.e., feathered.

Access to the control center 52 is provided via road 53 and underpass 54. Underpass 54 facilitates traffic flow to the control center 52.

Referring now to FIGS. 4a, 4b, 5a, and 5b, the sail 14 is preferably symmetric and shaped such that either side thereof may be utilized to generate lift. Camber is provided by the deflection of a flap 15 formed at the trailing edge of the sail 14. Movement of the flap 15 is preferably controlled by a microprocessor based controller in a manner which maximizes lift for a given wind speed, wind direction, and carriage direction.

A tail 16 is pivotally mounted at the end of tail boom 18 and the position of the tail 16 may be varied via electrical or hydraulic actuator 25 under the direction of the microprocessor based controller. The actuator 25 is attached to the tail 16 via first tail arm 21. The tail 16 is preferably mechanically linked to the flap 15 via link bar 23 which is attached to the tail 16 via second tail arm 19 and which attaches to the flap 15 via flap arm 17. Thus, as the tail 16 rotates in one direction, the flap 15 rotates in the opposite direction. Rotation of the tail 16 positions the sail 14 at a desired angle relative to the wind. Rotation of the flap 15 provides a desired degree of camber to the sail 14 so as to facilitate generation of lift from the wind. The link bar 23 provides the desired cooperation between the tail 16 and the flap 15 such that the optimal chamber is provided for a given orientation of the sail relative to the wind.

Figure 4A:
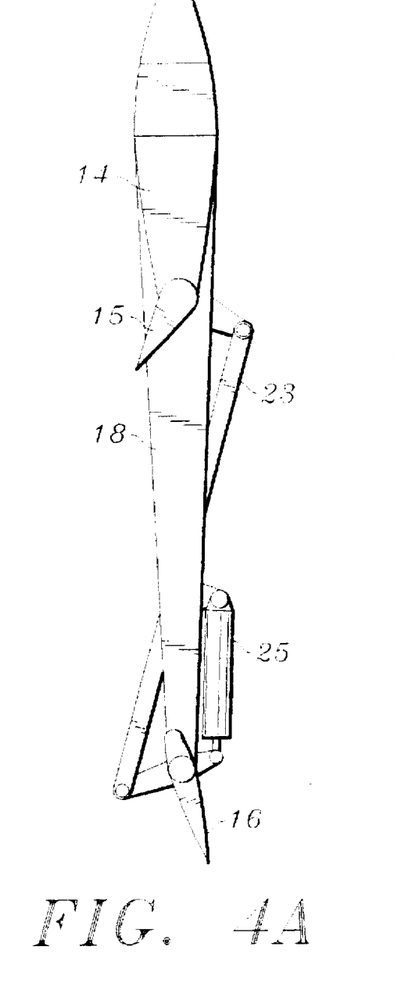
FIG. 4a is a top view of a sail and its associated tail, wherein the tail is oriented so as to cause the sail to rotate clockwise in order to maximize lift.
Figure 4B:
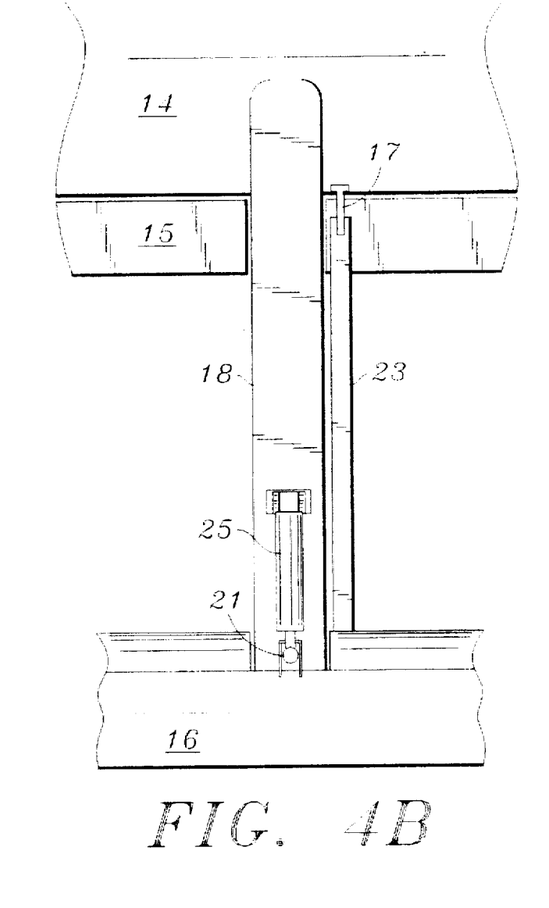
Figure 5A:
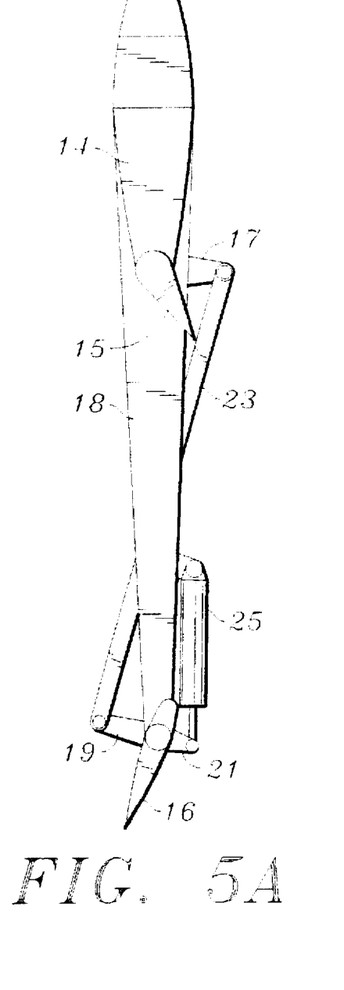
FIG. 5a is a top view of a sail and its associated tail, wherein the tail is oriented so as to cause the sail to rotate counter clockwise in order to maximize lift.
Figure 5B:
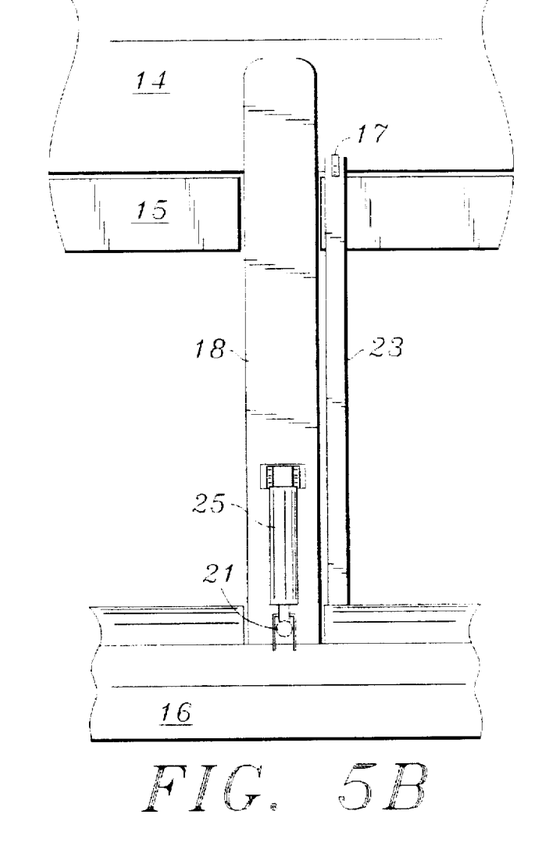

As shown in FIGS. 4a and 4b, the tail 16 is caused to move by the actuator 25 in one direction (to the right, or counter clockwise as shown), thereby causing the flap 15 to move in the opposite direction. As shown in FIGS. 5a and 5b, the tail 16 and the flap 15 are in opposite positions with respect to FIGS. 4a and 4b.

Figure 6:
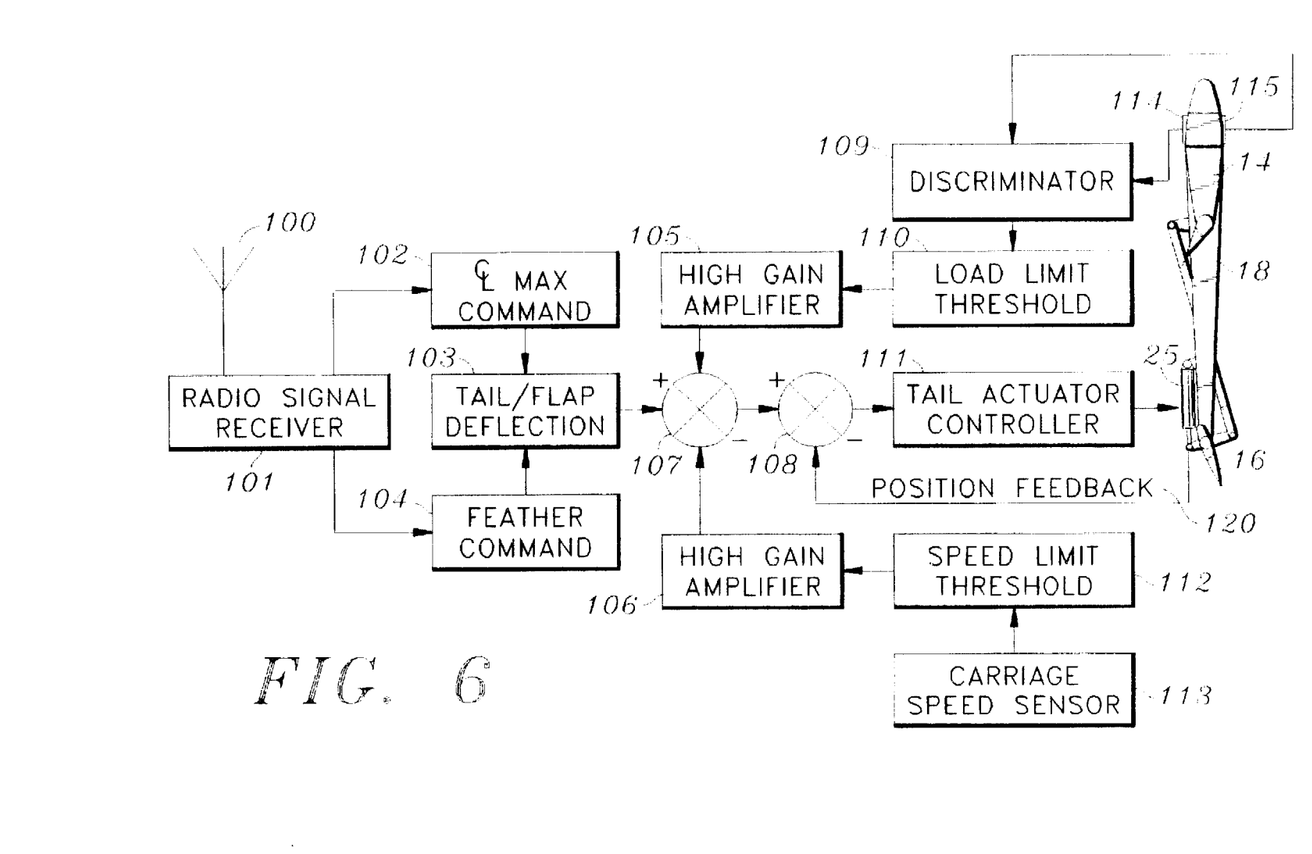
FIG. 6 is a schematic illustrating operation of the control system for the sail.

Referring now to FIG. 6, the preferred methodology for controlling the orientation of the sail 14 with respect to the wind is shown. An antenna 100 receives a command signal from the control center 52 (FIG. 3). The control signal is provided to radio signal receiver 101 which, based upon the control signal received, outputs either a maximum lift ($C_{L\ max}$) command 102 or a feather command 104. The max lift command 102 or the feather command 104 is then provided to the tail/flap detection circuitry 103 which provides an output, so as to cause the sail 14 to rotate to the desired position. Of course, if the sail is already in the desired position, it need not rotate at all and if the sail is in a different position, it is then caused to move to the desired position. The output of the tail/flap detection circuitry 103 is provided to summing junction 107, which then provides an output signal which is generally directly proportional to the signal from the tail/flap detection circuitry 103. An input signal from the high gain amplifier 105 for the load limit threshold circuitry 110 and an input signal from the high gain amplifier 106 for the speed limit threshold circuitry 112 are summed with the input signal from tail/flap detection circuitry 103 via summing junction 107.

A discriminator 109 receives the outputs of the first 114 and second 115 sets of strain gauges and determines which output is the greatest, such that that particular output can be utilized in controlling the position of the sail 14 so as to obtain maximum lift therefrom. Only the strain gauges from that side of the sail 14 upon which lift is presently being generated are utilized for controlling the position of the sail 14. The output of the discriminator 109 is provided to load limit threshold circuitry 110 which determines if a preset load, as indicated by the selected strain gauge, has been exceeded. If the preset load has been exceeded, then an output signal is provided which causes the sail to rotate so as to generate less lift therefrom.

In a similar fashion, speed limit threshold circuitry 112 receives a signal from carriage speed sensor 113 and provides an output which causes the sail 14 to reduce lift in response to receiving an input signal from the carriage speed sensor 113 indicative that the carriage 10 has attained a speed in excess of a predetermined speed. Thus, the carriage 10 is prevented from experiencing loads in speeds which may cause damage thereto. The output of the first summer 107 is provided to second summer 108 where it is summed with position feedback 120, which is representative of the position of the tail 16, so as to provide position control according to well known principles. The output of the second summer 108 is provided to the tail actuator controller 111 which then provides an output signal to the tail actuator 25, so as to position the tail 16 in the desired position.

Thus, having described structure of the linear motion wind power plant of the present invention, it may be beneficial to describe the operation thereof. Generally, a sufficient number carriages 10 are connected to one another so as to define a loop completely around the entire track 12, such that those carriages 10 which are traveling upwind and/or downwind are pulled by those carriages 10 traveling generally perpendicular to the wind direction 58.

The controller generally positions the sail 14 at an orientation such that maximum lift is provided thereby. This is accomplished by sensing the lift generated by sail 14 via strain gauges formed upon that side of the sail 14 upon which lift is presently being generated and turning the sail 14 so as to orient it in the position at which the generated lift is maximized. As mentioned above, a first plurality of strain gauges 114 are formed upon one side of the sail 14 and a second plurality of strain gauges 115 are formed upon the opposite side of the sail 14. Only those strain gauges formed upon that side of the sail generating lift at a given time are utilized. The value of the strain gauge having the greatest output is determined by the discriminator 109 and is utilized to effect rotation of the sail 14. In this manner, the sail 14 is oriented so as to provide optimal lift given the direction of travel of the carriage 10 and the wind direction 58.

The strain gauge output which is selected by the discriminator 109 and output therefrom is analyzed by the load limit threshold circuitry 110, so as to determine whether or not the predefined load has been exceeded. Excessive winds may cause the load experienced by the sail 14 to exceed this predetermined limit. If the load were allowed to increase beyond the predetermined limit, an unsafe condition may result, which might cause damage to the sail 14 and/or carriage 10. Thus, when the load limit threshold circuitry 110 senses that the predetermined load has been exceeded, the load limit threshold circuitry 110 outputs a signal to the high gain amplifier 105 which causes the tail actuator controller 111 to turn the sail 14, so as to reduce the load upon the sail 14, and consequently reduce the speed of carriage 10.

If the carriage speed sensor 113 senses that the carriage 10 is traveling at a speed in excess of a predetermined speed, the speed limit threshold circuitry 112 sends a signal to high gain amplifier 106, so as to similarly reduce the speed of the carriage 10.

The position of the sail 14 is changed by moving the tail 16 via the tail actuator 25 which receives a control signal from the tail actuator controller 111 in response to the output of strain gauges 114 and 115 or the radio signal receiver 101.

High gain amplifier 105 amplifies the output of the load limit threshold circuitry 110 prior to its being summed with the tail/flap detection circuitry 103 output. Similarly, high gain amplifier 106 amplifies the output of speed limit threshold circuitry 112 prior to its being summed by summer 107 with the output of tail/flap deflection circuitry 103.

Thus, if either the load limit threshold 110 or the speed limit threshold 112 is exceeded, then a signal is provided to the tail 16 which causes the sail 14 to a position which reduces the speed of the carriage 10. Thus, in the event of excessive wind conditions, the speed of the carriage 10 is maintained below a safe and desirable limit.

When it is desirable to halt movement of the carriages, a radio signal is sent from the control center 52 to the antenna 100. An output signal for the feather command 104 is provided by the radio signal receiver 101 to the tail/flap deflection circuitry 103, so as to effect feathering of the sail 14. Feathering of the sail 14 results in no lift being generated by the sails 14, consequently resulting in halting of the carriages.

When it is desired that motion of the carriages 10 be resumed, a signal indicating so is transmitted from the control center 52 to the antenna 100. The radio signal receiver 101 outputs a maximum lift command 102 to the tail/flap detection circuitry 103 which then causes the sail 14 to move to that position which provides maximum lift.

In order to utilize high wind velocity conditions on the open sea, the whole power plant, in particular, the track, could be floated on pontoons. An anchor would allow the plant to orient itself into an optimum position relative to the prevailing wind direction. Under sea cables would transmit the electric energy to shore.

It is understood that the exemplary linear motion wind power plant described herein and shown in the drawings represents only a presently preferred embodiment of the invention. Indeed, various modifications and additions may be made to such embodiment without departing from the spirit and scope of the invention. For example, those skilled in the art will appreciate that various different aerodynamic designs of the body, other than that illustrated, are likewise suitable. Further, various different shapes and configurations of the track are contemplated, depending upon the terrain and/or man-made obstructions dictating particular construction. Thus, these and other modifications and additions may be obvious to those skilled in the art and may be implemented to adapt the present invention for use in a variety of different applications.

What is claimed is:

1. A linear motion wind driven power plant comprising:
   a) a closed-loop track;
   b) a plurality of carriages configured to move around said track;
   c) at least one electrical power generator generating electrical power from the movement of said carriages around said track; and
   d) each of the carriages comprising a sail assembly, the sail assembly comprising:
      i) a sail turnable about a vertical axis thereof;
      ii) a sensor system for sensing lift provided by an action of wind upon the sail; and
      iii) a controller causing said sail to turn to a position wherein the sensed lift of the sail is approximately maximized.

2. The linear motion wind driven power plant as recited in claim 1 wherein said sail comprises a rigid sail.

3. The linear motion wind driven power plant as recited in claim 1 wherein said electrical power generator comprises at least one linear electrical generator.

4. The linear motion wind driven power plant as recited in claim 1 wherein said electrical power generator is disposed upon said carriages and thus move around said track therewith.

5. The linear motion wind driven power plant as recited in claim 1 wherein said electrical power generator is stationary with respect to said carriages.

6. The linear motion wind driven power plant as recited in claim 1 wherein each said has an aspect ratio of at least 10 to 1.

7. The linear motion wind driven power plant as recited in claim 1 wherein each sail comprises a tail for facilitating trimming thereof.

8. The linear motion wind driven power plant as recited in claim 1 wherein said plurality of carriages comprises a closed-loop of interconnected carriages such that carriages moving upwind are pulled by other carriages.

9. The linear motion wind driven power plant as recited in claim 1 wherein said plurality of carriages comprise a closed-loop of interconnected carriages such that both carriages moving upwind and carriages moving downwind are pulled by other carriages.

10. The linear motion wind driven power plant as recited in claim 1 further comprising a tail and a control system for trimming said tail so as to generally align said sail with a relative wind vector.

11. The linear motion wind driven power plant as recited in claim 1 further comprising a control system for feathering each sail when said carriages move substantially upwind and downwind so as to minimize wind drag thereon.

12. The linear motion wind driven power plant as recited in claim 1 further comprising a control system for varying the angle of attack of said sail depending upon wind speed.

13. The linear motion wind driven power plant as recited in claim 1 wherein each comprises a flap and wherein each sail is configured to have a side-to-side symmetric profile with sail camber being facilitated via deflections of said flap.

14. The linear motion wind driven power plant as recited in claim 1 wherein each sail comprises a bi-planar sail.

15. The linear motion wind driven power plant as recited in claim 1 wherein each sail is approximately 75 meters in height, so as to extend above a ground boundary layer.

16. The linear motion wind driven power plant as recited in claim 1 wherein each sail is spaced apart from another sail by a distance approximate to the height of said sail.

17. The linear motion wind driven power plant as recited in claim 1 wherein said carriages are not interconnected and further comprise motors for moving themselves upwind.

18. The linear motion wind driven power plant as recited in claim 17 wherein said motors comprise linear electrical motors.

19. The linear motion wind driven power plant as recited in claim 1 wherein said electrical power generator comprises a linear generator disposed within each carriage.

20. The linear motion wind driven power plant as recited in claim 19 wherein said linear generator is configured to function as a linear motor so as to move a carriage upwind.

21. The linear motion wind driven power plant as recited in claim 1 wherein said track has a width of at least one-tenth the height of said sail so as to accommodate a bending moment of said sail caused by lateral wind loading.

22. The linear motion wind driven power plant as recited in claim 1 wherein said track is configured to define two generally parallel segments connected at ends thereof by two generally semi-circular segments, the two parallel segments being generally perpendicular to the predominant wind direction.

23. The linear motion wind driven power plant as recited in claim 1 wherein said carriages comprise:

a) a plurality of wheels riding upon said track;

b) at least one electrical generator driven by at least one of said wheels; and c) at least one sliding contact for transferring electrical power from said generator(s).

24. The linear motion wind driven power plant as recited in claim 1 wherein said electrical power generator comprises:

a) magnets attached to said carriage; and b) a stationary armature disposed proximate said track;

c) wherein movement of said carriages around said track causes said magnets to induce electrical current into said armature.

* * * * *